US006335683B1

(12) United States Patent
Bouillet

(10) Patent No.: US 6,335,683 B1
(45) Date of Patent: Jan. 1, 2002

(54) SIGNAL DISCRIMINATING METHOD AND DEVICE FOR DETECTING INTRUSION INTO PREMISES

(76) Inventor: Damien Bouillet, 231 rue de Lille 59250, Halluin BP63 (FR)

( * ) Notice: Subject to any disclaimer, the term of this patent is extended or adjusted under 35 U.S.C. 154(b) by 0 days.

(21) Appl. No.: 09/142,140

(22) PCT Filed: Dec. 22, 1997

(86) PCT No.: PCT/FR97/02374

§ 371 Date: Oct. 30, 2000

§ 102(e) Date: Oct. 30, 2000

(87) PCT Pub. No.: WO98/29845

PCT Pub. Date: Jul. 9, 1998

(30) Foreign Application Priority Data

Jan. 3, 1997 (FR) ........................................... 97/00123

(51) Int. Cl.[7] ........................................... G03B 13/20

(52) U.S. Cl. .................... 340/544; 340/545.3; 340/550; 340/566; 367/93

(58) Field of Search .............................. 340/544, 545.1, 340/545.3, 435, 550, 565, 566; 367/665, 507, 93; 73/146.2; 454/256

(56) References Cited

U.S. PATENT DOCUMENTS

| | | | | | |
|---|---|---|---|---|---|
| 4,216,469 | A | * | 8/1980 | Hirmann et al. | 340/666 |
| 4,499,564 | A | * | 2/1985 | Sirai | 367/93 |
| 4,628,318 | A | * | 12/1986 | Alitz | 342/26 |
| 5,079,422 | A | * | 1/1992 | Wong | 250/343 |
| 5,464,369 | A | * | 11/1995 | Federspiel | 454/256 |
| 5,606,122 | A | * | 2/1997 | Taguchi et al. | 73/146.2 |
| 5,764,136 | A | * | 6/1998 | Harron | 340/435 |
| 5,790,413 | A | * | 8/1998 | Bartusiak et al. | 700/174 |

* cited by examiner

*Primary Examiner*—Benjamin C. Lee
(74) *Attorney, Agent, or Firm*—Miles & Stockbridge P.C.

(57) ABSTRACT

The invention concerns a method for discriminating between signals generated by means sensitive to variations in the pressure of a gaseous fluid. This method is characterized in that, in order to discriminate between electrical signals, it operates as follows: when a means (5) sensitive to pressure variations generates an electrical signal, the evolution of the amplitude of at least one characteristic of this signal is monitored and, when two successive amplitude variations (A1, A2) substantially opposite relative to a median value (M) are detected, a means (6) for informing people is inhibited, whereas when amplitude variations of a different type are detected, the means (6) for informing people is activated.

4 Claims, 1 Drawing Sheet

SIGNAL DISCRIMINATING METHOD AND DEVICE FOR DETECTING INTRUSION INTO PREMISES

Figure 1:
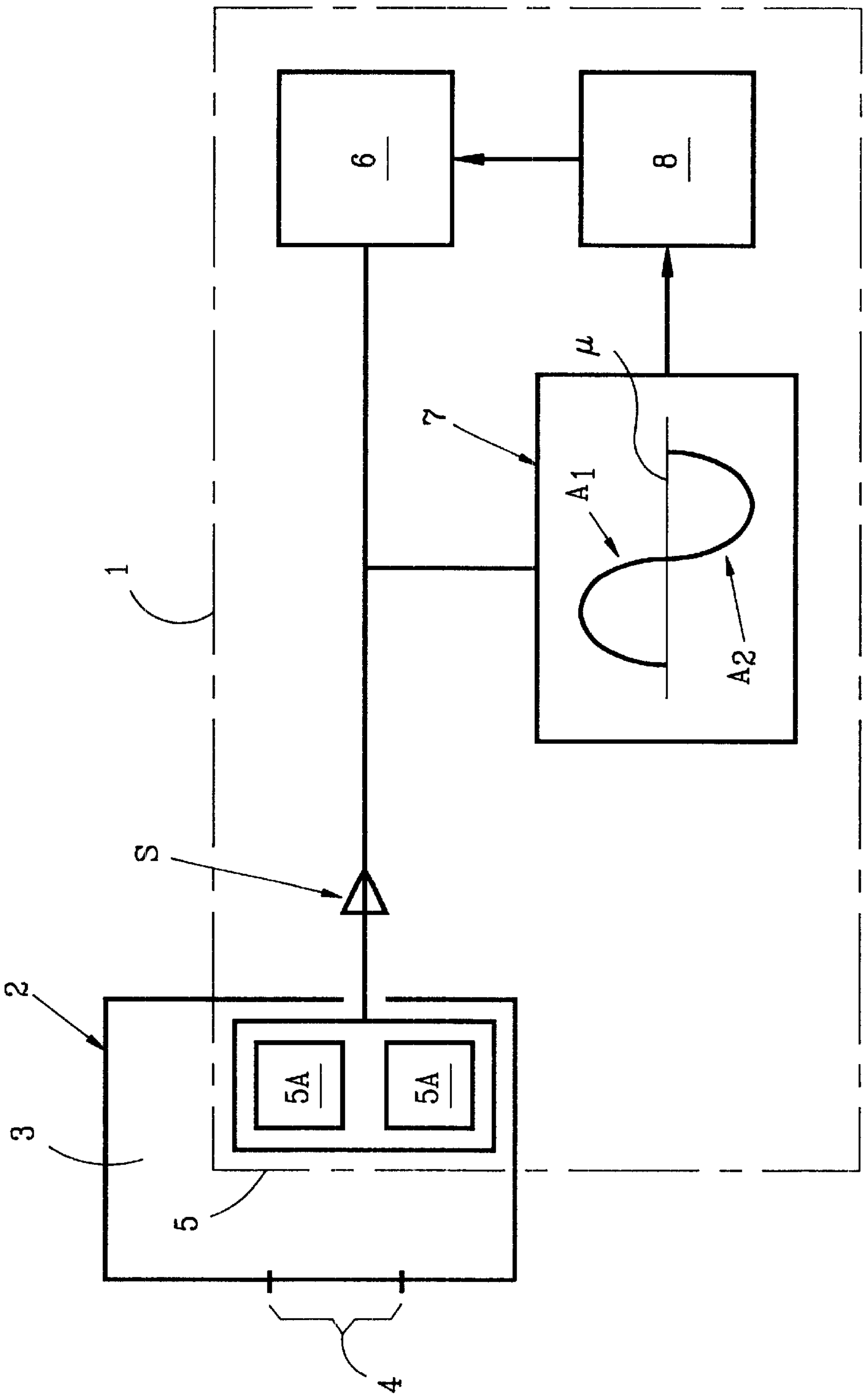

The invention relates to a signal discriminating method used in the field of detecting intrusions into premises.

The invention concerns the field of detecting intrusions into premises and specifically relates to a method for discriminating between the signals generated by at least one means sensitive to variations in the pressure of a gaseous fluid constituting the atmosphere of these premises.

The invention also relates to means for implementing the method of the invention, as well as to intrusion detecting devices which comprise these means.

The term premises designates any enclosed space capable of containing at least one person, such as a room of a building, a shed, or the passenger compartment of a vehicle.

The technical field of the invention is that of devices for detecting intrusions into premises, of the type that operate by detecting at least one pressure variation in these premises, such as that resulting from the opening of at least one exit of these premises.

More particularly, though not exclusively, the invention is intended as an improvement to the device that is the subject of the Applicant's patent FR-A-2.696.033.

Detection devices of this type make use of at least one means sensitive to the air pressure of the premises under surveillance, which generates an electrical signal in connection with any pressure variation detected in these premises.

Intrusion detecting devices that operate in this way are sensitive to pressure variations produced in the premises by phenomena outside these premises, such as those resulting from a gust of wind or a displacement of air generated by the passing of a vehicle.

An object of the invention is to provide a method for discriminating between the signals generated by at least one pressure-sensitive means within the scope of detecting intrusions into premises.

To this end, the subject of the invention is a method for discriminating between signals generated by at least one pressure-sensitive means within the scope of detecting intrusions into premises, characterized in that in order to discriminate between the electrical signals:

- when the means sensitive to pressure variations generates an electrical signal, the evolution of the amplitude of at least one characteristic of this signal is monitored,
- when two successive amplitude variations substantially opposite relative to a median value are detected, the means for informing people is inhibited, whereas
- when amplitude variations of a different type are detected, the means for informing people is activated.

The invention also relates to means for implementing the method of the invention as well as intrusion detecting devices which comprise these means.

The invention will be clearly understood with the aid of the description below, given as a non-limiting example in reference to the appended drawing, which schematically represents a device using the means of the invention.

The drawing shows a device 1 for detecting an intrusion into premises 2, this device being of the type that operates by detecting at least one variation in the pressure of the prevailing gaseous atmosphere 3 in these premises 2, such as a pressure variation resulting from the opening of at least one exit 4 of these premises 2.

This device 1 comprises at least:

- one means 5 which, being sensitive to variations in the pressure of the gaseous atmosphere of the premises, is capable of generating at least one electrical signal S reflecting at least the variations in this pressure and,
- at least one means 6 using this signal to inform people (not represented) of the detection of an intrusion into the premises equipped with the device.

Remarkably, in order to discriminate between the electrical signals:

- when the means 5 sensitive to pressure variations generates an electrical signal, the evolution of the amplitude of at least one characteristic of this signal is monitored, and
- when two successive amplitude variations A1, A2 substantially opposite relative to a median value M are detected, the means 6 for informing people is inhibited, whereas
- when amplitude variations of another nature are detected, the means 6 for informing people is activated.

In the course of his research, the inventor observed that the pressure variations produced in the atmosphere of premises as a result of a natural event outside the premises, such as a gust of wind, caused a pressure evolution comprising two waves of opposite amplitudes.

The present method is based on the use of this phenomenon.

The means for implementing the method of the invention are remarkable in that they comprise:

- a means 7 for monitoring the evolution of the amplitude of at least one characteristic of this signal and for detecting two successive amplitude variations substantially opposite relative to a median value, and
- a means 8 for inhibiting the means 6 for informing people when two successive amplitude variations substantially opposite relative to a median value are detected.

The means 5 which, being sensitive to variations in the pressure of the gaseous atmosphere of the premises, is capable of generating at least one electrical signal S reflecting the variations of this pressure, is the type comprising at least two substantially distinct elements 5A, separated from one another by a predetermined value.

I claim:

1. A method for discriminating between signals generated by at least one means sensitive to variations in the pressure of a gaseous fluid constituting the atmosphere of premises, for the purpose of detecting an intrusion into these premises (2), this process using a device (1) which:

operates by detecting at least one variation in the pressure of the prevailing gaseous atmosphere (3) in said premises (2), and comprises at least:

one means (5) which, being sensitive to variations in the pressure of the gaseous atmosphere of the premises, is capable of generating at least one electrical signal (S) reflecting at least the variations in this pressure and, at least one means (6) using this signal to inform people of the detection of an intrusion into the premises equipped with this device, this process being characterized in that, in order to discriminate between the electrical signals:

when the means (5) sensitive to pressure variations generates an electrical signal, the evolution of the amplitude of at least one characteristic of this signal is monitored and, when two successive amplitude variations (A1, A2) substantially opposite relative to a median value (M) are detected, the means (6) for informing people is inhibited, whereas when amplitude variations of a different type are detected, the means (6) for informing people is activated.

2. Means for implementing the method according to claim 1, characterized in that they are comprised of:

a means (7) for monitoring the evolution of the amplitude of at least one characteristic of this signal and for detecting two successive amplitude variations substantially opposite relative to a median value, and a means (8) for inhibiting the means (6) for informing people when two successive amplitude variations substantially opposite relative to a median value are detected.

3. A device for detecting intrusions into premises according to the method of claim 1, which device operates by detecting at least one variation in the pressure of the prevailing gaseous atmosphere (3) in said premises (2), and comprises at least:

one means (5) which, being sensitive to variations in the pressure of the gaseous atmosphere of the premises, is capable of generating at least one electrical signal (S) reflecting at least the variations in this pressure and, at least one means (6) using this signal to inform people of the detection of an intrusion into the premises equipped with the device, this device being characterized in that it comprises:

a means (7) for monitoring the evolution of the amplitude of at least one characteristic of this signal and for detecting two successive amplitude variations substantially opposite relative to a median value, and a means (8) for inhibiting the means (6) for informing people when two successive amplitude variations substantially opposite relative to a median value are detected.

4. The device according to claim 3, characterized in that the means (5) which, being sensitive to variations in the pressure of the gaseous atmosphere of the premises, is capable of generating at least one electrical signal (S) reflecting the variations in this pressure, is the type comprising at least two substantially distinct elements (5A) separated from one another by a predetermined value.

* * * * *